US008073775B1

(12) United States Patent
Del Favero et al.

(10) Patent No.: US 8,073,775 B1
(45) Date of Patent: Dec. 6, 2011

(54) METHOD AND SYSTEM FOR USING AN ELECTRONIC CHECK SYSTEM

(75) Inventors: James R. Del Favero, Redwood City, CA (US); Paul J. Rosenfeld, Mountain View, CA (US); Robert Gaynor, Westlake Village, CA (US)

(73) Assignee: Intuit Inc., Mountain View, CA (US)

(*) Notice: Subject to any disclaimer, the term of this patent is extended or adjusted under 35 U.S.C. 154(b) by 124 days.

(21) Appl. No.: 11/796,375

(22) Filed: Apr. 27, 2007

(51) Int. Cl.
*G06Q 40/00* (2006.01)
(52) U.S. Cl. .......................................................... 705/40
(58) Field of Classification Search .................. 705/40
See application file for complete search history.

(56) References Cited

U.S. PATENT DOCUMENTS

| 6,282,523 | B1* | 8/2001 | Tedesco et al. | 705/45 |
| 2002/0013767 | A1* | 1/2002 | Katz | 705/39 |
| 2005/0131816 | A1* | 6/2005 | Britto et al. | 705/39 |
| 2006/0253339 | A1* | 11/2006 | Singh et al. | 705/26 |
| 2007/0214078 | A1* | 9/2007 | Coppinger | 705/39 |
| 2008/0040265 | A1* | 2/2008 | Rackley, III et al. | 705/40 |
| 2008/0046362 | A1* | 2/2008 | Easterly | 705/40 |
| 2008/0221964 | A1* | 9/2008 | Berkovitz et al. | 705/9 |

OTHER PUBLICATIONS

Haward M Zarisky, Gift Tax-Free Income Shifting; Estate Plannng. New York: Jun. 2006. vol. 33, Iss. 6; p. 47,2pgs.*
Mike Hoover. Proposal would recall firefighter, York Daily Record. York, Pa. : Mar. 7, 2006. p. 1/05.*
Regulatory Roundup. American Banker. New York, N.Y.: Dec. 8, 2005. vol. 170, Iss. 234; p. 4.*

* cited by examiner

*Primary Examiner* — Hani M Kazimi
*Assistant Examiner* — Hatem Ali
(74) *Attorney, Agent, or Firm* — Osha • Liang LLP

(57) ABSTRACT

In general, the invention relates to a method for transferring funds. The method includes receiving a request to initiate a secure fund transfer, where the request specifies a sender, a recipient, and an amount of funds to transfer from the sender to the recipient. The method further includes sending a request to verify that an account associated with the sender comprises at least the amount of funds to be transferred, receiving notification that the account comprises at least the amount of funds to be transferred, requesting a reservation of funds in the account corresponding to the amount of funds to be transferred, receiving notification of the reservation, notifying the recipient that the amount of funds to be transferred is reserved, initiating a transfer of funds, to the recipient, in the amount of the reserved funds, and receiving acknowledgment that the transfer of the funds is complete.

26 Claims, 7 Drawing Sheets

METHOD AND SYSTEM FOR USING AN ELECTRONIC CHECK SYSTEM

BACKGROUND

Commonly in business, two parties in different locations will require a transfer of funds as part of a business transaction. The funds are typically transferred using one of the following methods: physical check, fund transfer through an online bank, and electronic fund transfer (EFT) using a network for financial transactions (NFT). Each of these methods is described below.

If the funds a transferred using a physical check, the person sending funds to the recipient for goods or services typically mails a physical check to the recipient. Depending upon the method of delivery (e.g., regular mail, express mail, and/or other common couriers), the check may take a number of days to deliver. In the interim, the only surety the recipient has that payment will be made is the integrity of the sender; therefore, the recipient refrains from performing services or delivering goods until the check is received. Alternatively, the recipient performs before receipt of the check, but risks not receiving payment.

Online banks allow any person holding a credit card and/or a physical bank account to register with an online bank. After registration has been completed, the person is provided with an online bank account and may perform electronic transactions with any person other registered with the same online bank. With respect to transferring funds between parties, the online bank is able to electronically transfer funds from the physical bank account and/or credit cards into an online bank account. Further, the online banks are able to transfer funds between online bank accounts.

Similar to online banks, NFT provides an alternative to physical methods of payment. A NFT requires that the financial institutions involved in a NFT transaction (e.g., an EFT) be registered with the network. A NFT transaction is initiated by an Originator requesting authorization from a Receiver. Upon receipt of authorization from the Receiver, the Originator creates a NFT entry to be sent to the Originating Depository Financial Institution (ODFI). The entry is then passed to a NFT Operator, which upon receipt, sends the entry to the Receiving Depository Financial Institution (RDFI). Provided there are adequate funds in the ODFI and the entry is authorized, the RDFI will clear the transaction.

SUMMARY

In general, in one aspect, the invention relates to a method for transferring funds. The method includes receiving a request to initiate a secure fund transfer, wherein the request to initiate the secure fund transfer specifies a sender, a recipient, and an amount of funds to transfer from the sender to the recipient. The method further includes sending a request to verify that an account associated with the sender comprises at least the amount of funds to be transferred, receiving notification that the account comprises at least the amount of funds to be transferred, requesting a reservation of funds in the account corresponding to the amount of funds to be transferred, receiving notification of the reservation, notifying the recipient that the amount of funds to be transferred is reserved, initiating a transfer of funds, to the recipient, in the amount of the reserved funds, and receiving acknowledgment that the transfer of the funds is complete.

In general, in one aspect, the invention relates to a method for transferring funds. The method includes obtaining transfer details comprising information associated with a sender's account, information associated with a recipient, and an amount of funds to transfer from the sender's account to the recipient. The method further includes initiating a secure fund transfer using the transfer details, receiving notification that funds are reserved in the sender's account corresponding to the amount of funds to transfer, receiving notification that the recipient is notified that the funds are reserved and available to the recipient, and receiving acknowledgment that the secure fund transfer is complete.

In general, in one aspect, the invention relates to a system for transferring funds. The system includes an electronic check system configured to accept a request to perform a secure fund transfer using transfer details, wherein the transfer details specify a sender, a recipient, and an amount of funds to be transferred from the sender to the recipient. The electronic check system is further configured to request an account interface to reserve funds in a sender's account corresponding to the amount of funds to be transferred and notify the recipient of the reservation of funds in sender's account. The system further includes the account interface operatively connected to the electronic check system and configured to reserve, in response to the request, funds in the sender's account.

In general, in one aspect, the invention relates to a computer readable medium, embodying instructions executable by the computer to perform method steps for managing trust level in a community, the instructions including functionality to receive a request to initiate a secure fund transfer, wherein the request to initiate the secure fund transfer specifies a sender, a recipient, and an amount of funds to transfer from the sender to the recipient. The instructions further include functionality to send a request to verify that an account associated with the sender comprises at least the amount of funds to be transferred, receive notification that the account comprises at least the amount of funds to be transferred, request a reservation of funds in the account corresponding to the amount of funds to be transferred, receive notification of the reservation, notify the recipient that the amount of funds to be transferred is reserved, initiate a transfer of funds, to the recipient, in the amount of the reserved funds, and receive acknowledgment that the transfer of the funds is complete.

In general, in one aspect, the invention relates to an application program interface (API). The API includes executable code for obtaining transfer details comprising information associated with a sender's account, information associated with a recipient, and an amount of funds to transfer from the sender's account to the recipient. The API further includes executable code for initiating a secure fund transfer using the transfer details, receiving notification that funds are reserved in the sender's account corresponding to the amount of funds to transfer, receiving notification that the recipient is notified that the funds are reserved and available to the recipient, and receiving acknowledgment that the secure fund transfer is complete.

Other aspects of the invention will be apparent from the following description and the appended claims.

DETAILED DESCRIPTION

Figure 1:
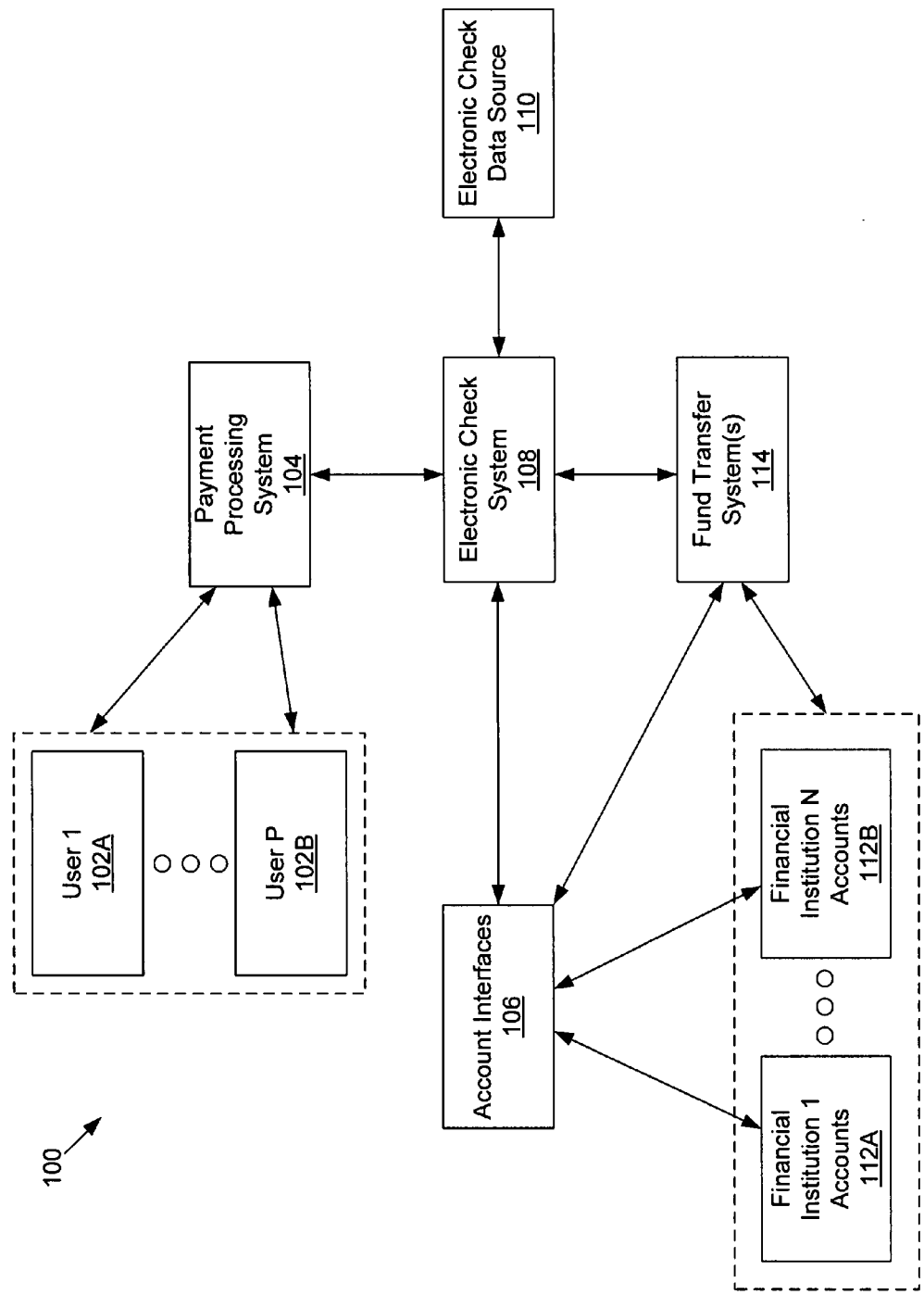
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. As used herein in the specification and figures, "ST" is essentially the same as "Step."

In general, embodiments of the invention relate to providing a method and a system for transferring funds. More specifically, embodiments of the invention provide a method and system to transfer funds between a sender and a recipient, where the funds are secured in an account during the transfer.

FIG. 1 shows a system for transferring funds in accordance with one or more embodiments of the invention. The system includes users (102A, 102B) interacting with a payment processing system (104). In one embodiment of the invention, the payment processing system interacts with an electronic check system (108). The electronic check system (108) further communicates with account interfaces (106), an electronic check data source (108), and a fund transfer system (114). In one embodiment of the invention, the account interfaces (106) and the fund transfer system(s) (114) may interact directly or indirectly with the financial institution accounts (112A, 112B).

In one embodiment of the invention, the users (102A, 102B) may be any entity (e.g., an individual, group of individuals, organization, or other legal entity) capable of participating in a transfer of funds. For example, user 1 (102A) may hold a financial institution 1 account (112A). Further, user 1 (102A) may be participating in a commercial transaction, transferring funds without consideration, paying a bill, or performing some other activity requiring the transfer of funds.

In one embodiment of the invention, the users (102A, 102B) interact with a payment processing system (104). For example, the users (102A, 102B) may access the payment processing system (104) over the Internet (or other Wide Area Network or Local Area Network) through a web browser (or other interface for communicating over a network). Alternatively, the users (102A, 102B) may interact with the payment processing system (104) through an application running natively on a user's (102A, 102B) local computer. Further, in one embodiment of the invention, the payment processing system (104) may interact with the users (102A, 102B) through use of notifications. These notifications may be conveyed by electronic mail, short message service (SMS), or some other form of correspondence.

In one embodiment of the invention, the payment processing system (104) is configured to process requests from the users (102A, 102B) and to send the requests to the electronic check system (108). In one embodiment of the invention, the electronic check system (108) may store information associated with the secure fund transfers in an electronic check data source (110). In one embodiment of the invention, the electronic check data source (110) is a database, which includes an entry for each electronic check processed by the electronic check system (108). In addition, each of the aforementioned entry may include information associate with the electronic check such as the sender, the recipient, the amount of funds transferred (or to be transferred), the currency of the funds, information about the sender's financial institution and/or the recipient's financial institution, the status of the transfer (e.g., funds have been transferred, funds have not been transferred, transfer failed, or any other status identifier).

Continuing with the discussion of FIG. 1, the electronic check system (108) is configured to process secure fund transfers initiated by the users (102A, 102B). Specifically, in one embodiment of the invention, the electronic check system (108) may send requests to account interfaces (106) to retrieve information associated with the financial institutions' accounts (112A, 112B) and/or to perform (or initiate the performance of) transactions (e.g., place a hold on funds, debit funds, credit funds, or any other action, which may be performed) on the financial institutions' accounts (112A, 112B).

In one embodiment of the invention, accounts (112A, 112B) may be any accounts capable of reserving funds (i.e., bank accounts, brokerage accounts, insurance accounts, credit accounts, or any other accounts capable of reserving funds). Further, in one embodiment of the invention, a financial institution may corresponds to any institution capable of providing financial services (e.g., banks, building societies, credit unions, stock brokerages, asset management firms, or any other entity capable of maintaining, managing and/or interacting with accounts).

Further, in one embodiment of the invention, the electronic check system (108) may send requests to initiate the transfer of funds to the fund transfer system(s) (114). Examples of possible fund transfer system(s) (114) include: an automated clearing house (ACH), an electronic wiring system, a processor of physical checks, or some other system for transferring funds. In one embodiment of the invention, the fund transfer system(s) (114) may perform the transfer of funds by directly interacting with the financial institutions' accounts (112A, 112B). Alternatively, the fund transfer system(s) (114) may interact with the account interfaces (106) to transfer funds.

Figure 2:
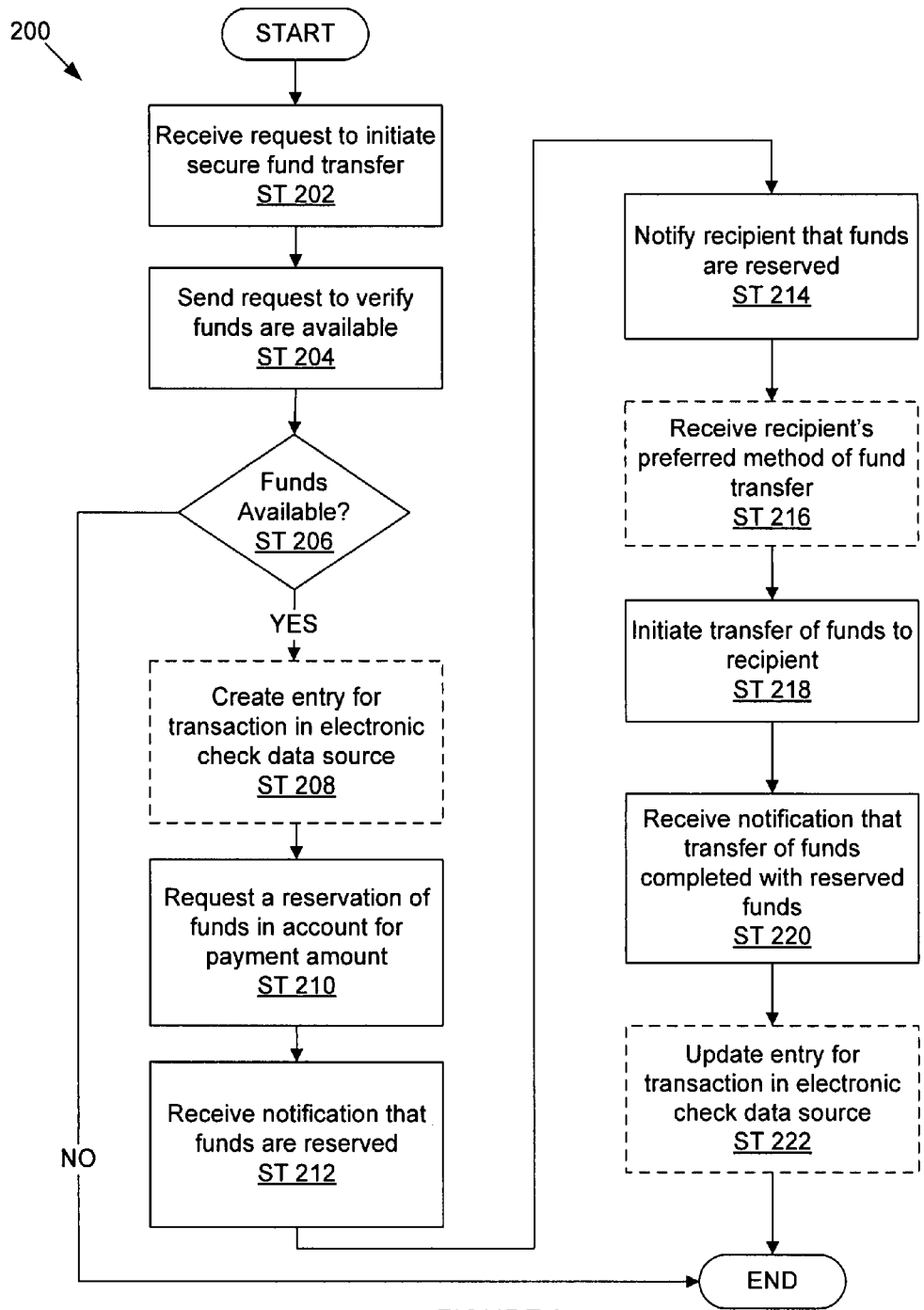
FIG. 2 shows a flow chart for a secure fund transfer in accordance with one or more embodiments of the invention.

FIG. 2 shows a flow chart for secure fund transfers in accordance with one or more embodiments of the invention. In one or more embodiments, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, a request to initiate a secure fund transfer is received (Step 202). In one embodiment of the invention, a payment processing system may send the request to initiate the secure fund transfer. Alternatively, the request to initiate the secure fund transfer may be sent automatically based on a schedule. In one embodiment of the invention, the request may specify the sender, an account associated with the sender, a recipient, and an amount of funds to be transferred from the sender to the recipient. Those skilled in the art will appreciate that the request may further specify a variety of information including but not limited to: the sender's preferred method of transfer, a method of encryption, a date and time to schedule the secure fund transfer, a second account associated with the sender, or some other information that may be used in a transfer of funds.

In one embodiment of the invention, a request may be sent to verify that the account associated with the sender has sufficient funds for the secure fund transfer (Step 204). Alternatively, those skilled in the art will appreciate that the request may verify that the cumulative funds in the accounts associated with the sender have sufficient funds for the secure fund transfer. At this stage, a determination is made about whether sufficient funds for the secure fund transfer are available (Step 206). If sufficient funds are not available, then the process ends. If sufficient funds are available, an entry for the secure fund transfer may be created in the electronic check data source (Step 208).

Continuing with FIG. 2, a request may be sent for a reservation of funds in the amount to be transferred from sender to recipient (Step 210). In one embodiment of the invention, the reservation of funds may include flagging the funds as reserved. Alternatively, in one embodiment of the invention, reserving funds may include moving funds to a separate account associated with the sender (e.g., moving the funds to a journal account). Further, in one embodiment of the invention, the reservation may be for specific funds in the account associated with the sender. Alternatively, the reservation may be for the amount of funds to be transferred in the account associated with the sender. Subsequently, notification that the funds have been reserved may be received (Step 212).

Simultaneous with, or subsequent to, receiving notification that funds have been reserved, notification that the funds are secured may be sent to the recipient (Step 214). In one embodiment of the invention, the notification to recipient may include a request for the recipient's preferred method of transfer. For example, the sender may specify a limited number of methods of transfer from which the recipient may choose. Alternatively, all possible methods of transfer may be presented as options to the recipient. Alternatively, the method of transfer may be predetermined. Optionally, if the notification to the recipient includes a request for the recipient's preferred method of transfer, the recipient's preferred method of transfer may be received (Step 216). Those skilled in the art will appreciate the recipient's preferred method of payment may also include information associated with the recipient's account (or another account in which the recipient would like to funds to be transferred).

Those skilled in the art will appreciate that the notification may also include a request that the secure fund transfer be accepted by the recipient before the funds may be transferred in the secure fund transfer. For example, the secure fund transfer may be accepted by the recipient upon choosing a preferred method of transfer. In one embodiment of the invention, the notification may also include an option for the recipient to decline the funds.

At this stage, in one embodiment of the invention, the transfer of funds to the recipient may be initiated (Step 218). Those skilled in the art will appreciate that the transfer of funds may be performed by a variety of methods. For example, the funds may be transferred by next day payment through a network for financial transactions, by wiring the funds electronically, by mailing a physical check, or by some other method of transferring funds. Further, those skilled in the art will appreciate that mailing the physical check may include requesting a third-party payment processor generate and mail the physical check. Alternatively, mailing the physical check may include requesting the sender complete and mail the physical check. Embodiments of Step 218 are described below in FIGS. 3 and 4.

Upon completion of the transfer of funds, acknowledgment that the transfer of funds has been completed with the reserved funds may be received (Step 220). In one embodiment of the invention, the transfer of funds may be cleared with the specific funds reserved for the secure fund transfer. Alternatively, the transfer of funds may be cleared with funds in the amount of the reserved funds, and then the reservation of funds in the account of the sender may be removed. Optionally, an acknowledgment that the secure fund transfer is complete may be sent to the sender.

Simultaneously with, or subsequent to, receiving acknowledgment that the transfer of funds has been cleared, those skilled in the art will appreciate that the entry for the secure fund transfer may be updated in the electronic check data source (Step 222).

Figure 3:
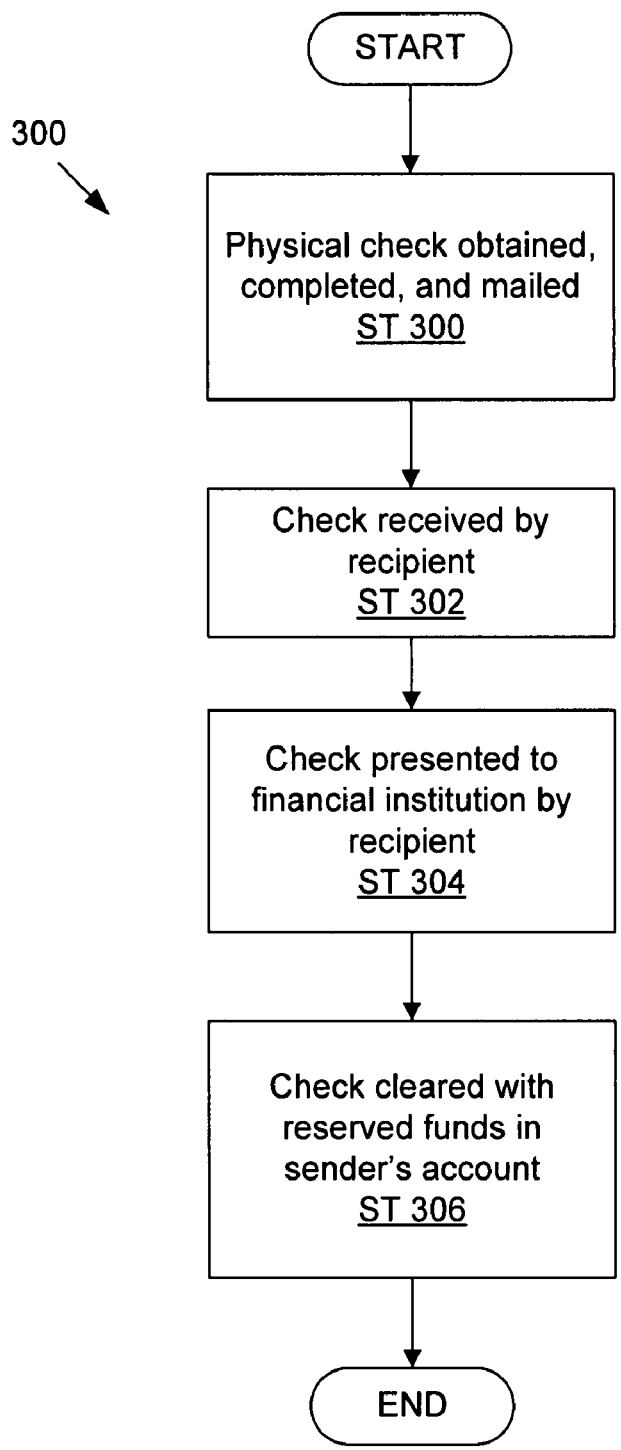
FIG. 3 shows a flow chart for a transfer of funds by physical check in accordance with one or more embodiments of the invention.

FIG. 3 shows a flow chart for a transfer of funds by physical check transfer in accordance with one or more embodiments of the invention. In one or more embodiments, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In one embodiment of the invention, the initiation of a transfer of funds (Step 218) may be for a transfer of funds by physical check. The following describes one embodiment for transferring funds using a physical check. Initially, a physical check is obtained, completed, and conveyed to the recipient (Step 300). In one embodiment of the invention, the sender may obtain a physical check and complete (i.e., by hand or electronically) the physical check for the recipient.

Alternatively, the physical check may be generated for the recipient by a third-party payment processor. In this scenario, the electronic check system may send a request to the third-party payment processor. Upon receipt of the request by the third-party payment processor, the third-party payment processor generates and sends the check to the recipient. In one embodiment of the invention, the check generated by the third-party payment processor transfers funds an account associated with the third-party payment processor. In such cases, sufficient funds are transferred from the recipient to the third-party payment processor via, for example, the electronic check system.

Continuing with the discussion of FIG. 3, those skilled in the art will appreciate that the physical check may be conveyed by any number of methods. For example, the physical check may be mailed to the recipient. Alternatively, the physically check may be physically delivered by a courier not associated with a mail delivery service.

Once the physical check is sent to the recipient, the recipient receives the physical check in due course (Step 302). Those skilled in the art will appreciate that the recipient may hold the physical check for an extended period of time before presenting it to a financial institution. Further, the physical check may only be valid until a certain expiration date. If the recipient holds the physical check without presenting it to a financial institution past the expiration date of the physical check, then the reservation of funds may be removed and the secure fund transfer may be canceled.

At this stage, in one embodiment of the invention, the recipient may present the physical check to a financial institution (Step 304). Those skilled in the art will appreciate that the financial institution may correspond to any number of institutions capable of providing financial services (e.g. banks, building societies, credit unions, stock brokerages, asset management firms, or any other entity capable of processing the check to enable the transfer of funds to the recipient). Next, the financial institution may clear the check with the reserved funds in the sender's account, completing the transfer of funds (Step 306). Those skilled in the art will appreciate that the financial institution may clear the check by any number of methods (e.g. accounts receivable conversion, paper clearing, image exchange or any other appropriate method).

Figure 4:
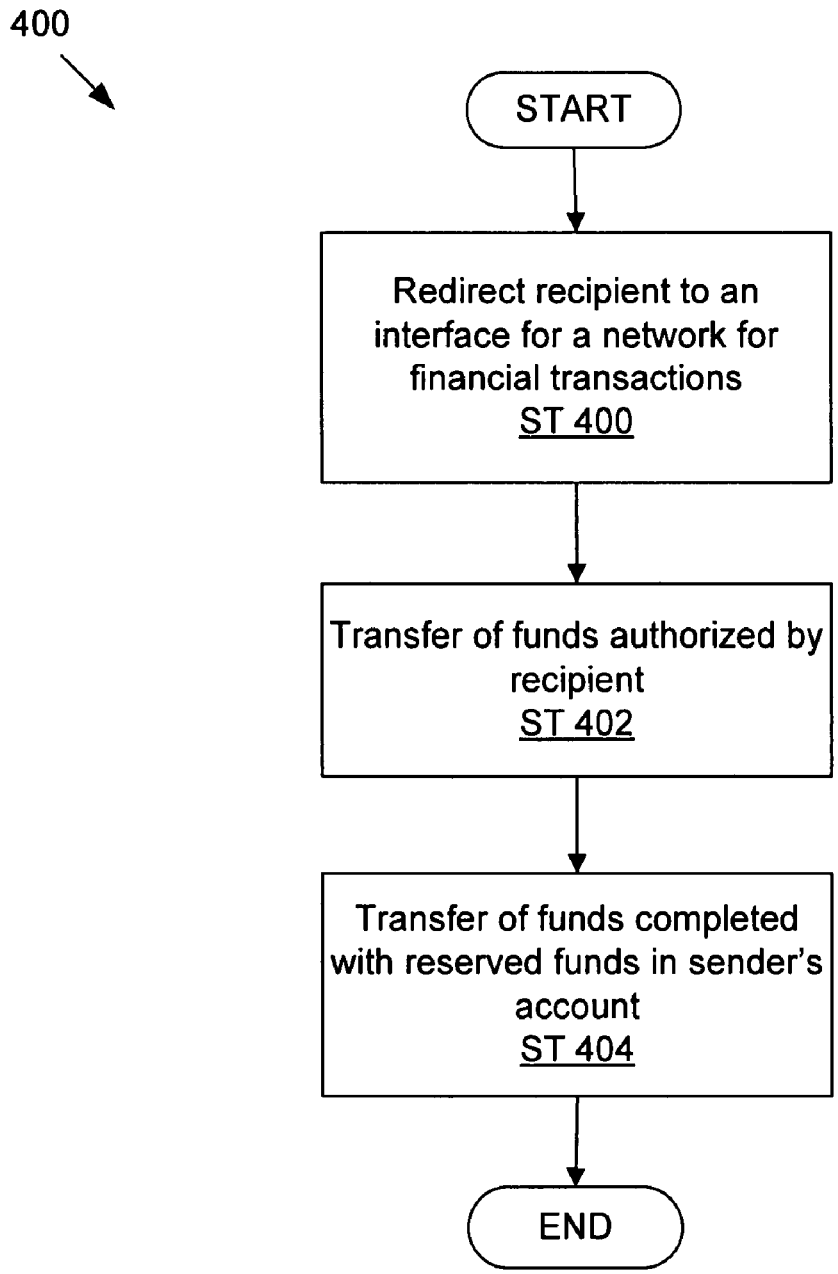
FIG. 4 shows a flow chart for a transfer of funds using a network for financial transactions in accordance with one or more embodiments of the invention.

FIG. 4 shows a flow chart for a transfer of funds using a network for financial transactions (NFT) in accordance with one or more embodiments of the invention. In one or more embodiments, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In one embodiment of the invention, the initiation of a transfer of funds (Step 218) may be for a transfer of funds by NFT transfer. The following describes one embodiment for transferring funds using a NFT. Initially, the recipient may be presented with an interface for the NFT (Step 400). For example, a reference to the interface for the NFT may be presented in an electronic mail to the recipient. Alternatively, the recipient may be directed to the interface for the NFT through another type of correspondence. Next, in one embodiment of the invention, the recipient may authorize the NFT transfer (Step 402). Those skilled in the art will appreciate that the authorization of the NFT transfer may specify the recipient's account. Optionally, if the recipient is not registered with the NFT, the recipient may be required to register with the NFT before authorizing the NFT transfer. At this stage, the NFT may complete the transfer of funds with the reserved funds in the sender's account (Step 404).

Alternatively, in one embodiment of the invention, the initiation of a transfer of funds (Step 218) may be for a transfer of funds by electronic bill payment. Those skilled in the art will appreciate that an electronic bill payment may transfer funds from a sender's account to a recipient's account. In one embodiment of the invention, the electronic bill payment may be processed by a financial institution. Alternatively, the electronic bill payment may be processed by a third-party payment processor.

Figure 5:
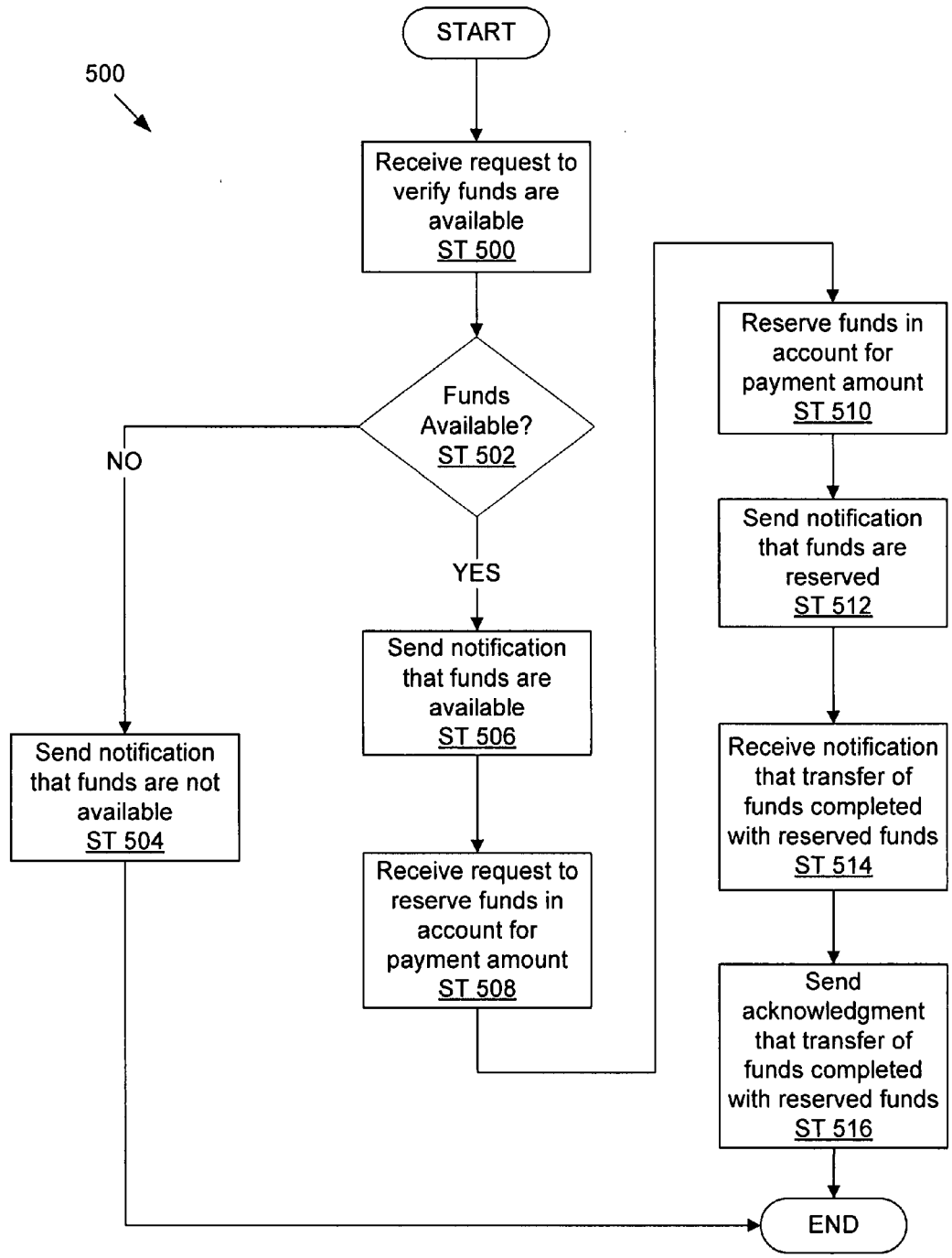
FIG. 5 shows a flow chart for a secure fund transfer from the perspective of an account interface in accordance with one or more embodiments of the invention.

FIG. 5 shows a flow chart for transferring funds in accordance with one or more embodiments of the invention. In one or more embodiments, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

More specifically, FIG. 5 shows a flow chart for the process of transferring funds from the perspective of an account interface. Initially, a request to verify funds are available is received (Step 500). In one embodiment of the invention, the request may specify a sender's account and an amount of funds to be transferred. Alternatively, the request may specify a number of sender's accounts and an amount of funds to be transferred.

At this stage, a determination is made as to whether the sender's account includes at least the amount of funds to be transferred (Step 502). If the sender's account does not include at least the amount of funds to be transferred, a notification that the funds are not available may be sent (Step 504), and the process ends. If the sender's account includes at least the amount of funds to be transferred, a notification that the funds are available may be sent (Step 506). Optionally, funds in the amount to be transferred may be temporarily reserved for a short period of time in anticipation of a request to reserve funds. For example, funds in the amount to be transferred may be reserved for two minutes while waiting for a request to reserve funds. Those skilled in the art will appreciate that the temporary reservation may be for any period of time.

At this stage, a request to reserve funds in the sender's account for the amount to be transferred is received (Step 508). Next, the amount of funds to be transferred is reserved in the sender's account (Step 510). In one embodiment of the invention, the reserving of funds may be performed by moving the funds to a separate journal account. Alternatively, the reserving of funds may be performed by designating the funds as reserved.

Simultaneously with, or subsequent to, reserving of funds in the sender's account, a notification that the funds have been reserved in the sender's account may be sent (Step 512). Next, an acknowledgement that the transfer of funds has been completed may be received (Step 514). In one embodiment of the invention, the notification that the transfer of funds has been completed may be a result of monitoring the sender's account. Alternatively, the notification that the transfer of funds has been completed may be sent by the entity performing the transfer of funds or a third-party system with access to the sender's account.

In one embodiment of the invention, the reservation of funds may be removed upon receiving notification that the transfer of funds has been completed. Alternatively, the reservation of funds may be removed by the entity performing the transfer of funds or a third-party system with access to the sender's account.

Continuing with the discussion of FIG. 5, upon receipt of the notification that the transfer of funds is completed, an acknowledgment that the transfer of funds has been completed with the reserved funds may be sent (Step 516).

Figure 6:
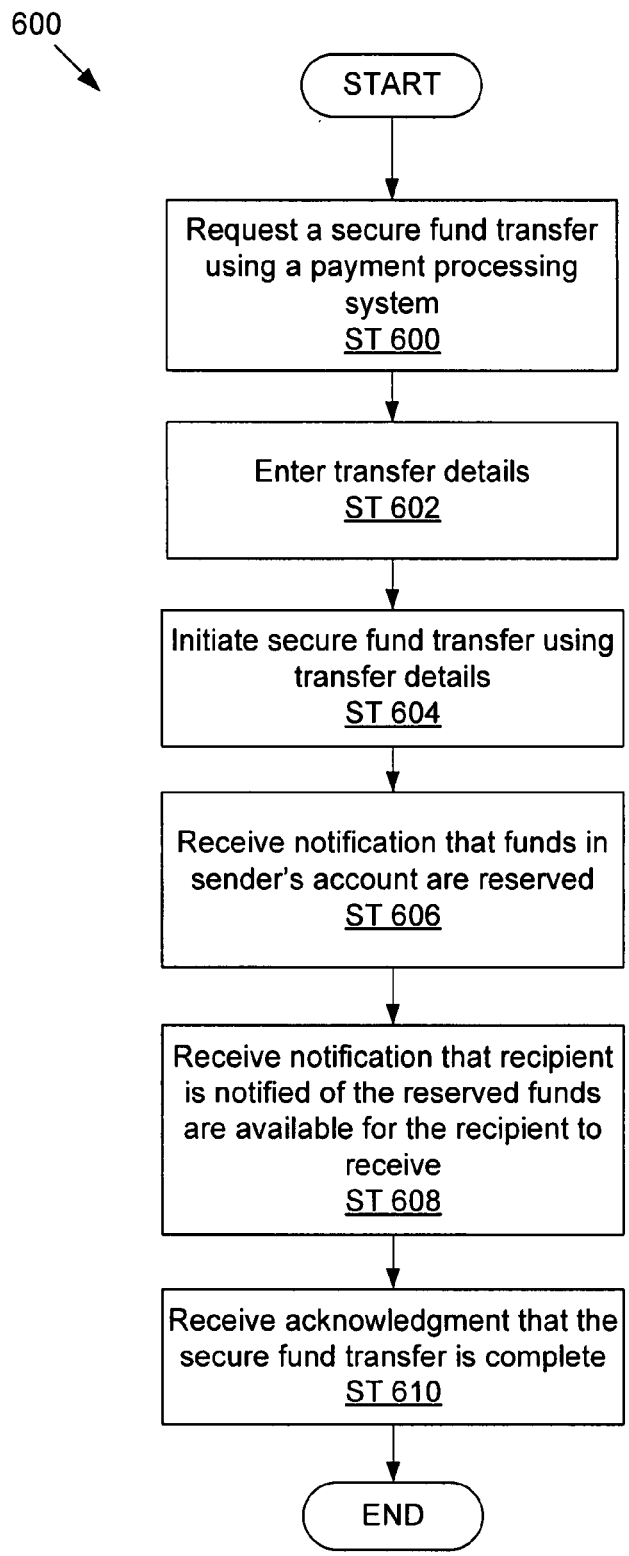
FIG. 6 shows a flow chart for a secure fund transfer from the perspective of a sender in accordance with one or more embodiments of the invention.

FIG. 6 shows a flow chart for transferring funds in accordance with one or more embodiments of the invention. In one or more embodiments, one or more of the steps shown in FIG. 6 may be omitted, repeated, and/or performed in a different order than that shown in FIG. 6. Accordingly, the specific arrangement of steps shown in FIG. 6 should not be construed as limiting the scope of the invention.

More specifically, FIG. 6 shows a flow chart for the process of transferring funds from the perspective of the sender. Initially, a secure fund transfer may be requested using a payment processing system (Step 600). Those skilled in the art will appreciate that the payment processing system may be accessible from any number of locations (e.g. sender's home, sender's place of business, public terminal, or another other device capable of enabling the user to interact with the payment processing system).

Next, transfer details for secure fund transfer may be entered (Step 602). Optionally, in one embodiment of the invention, certain transfer details may be pre-loaded. For example, the sender may have a default account specified for all secure fund transfers. Those skilled in the art will appreciate that the transfer details specified may include any number of details that could be used in a secure fund transfer (e.g. information associated with the sender, information associated with the sender's account, information associated with a recipient, the sender's preferred method of transfer, the sender's preferred method of encryption, or any other information the user may wish to provide or be required to provide).

At this stage, the secure fund transfer may be initiated with the transfer details entered by the sender (Step 604). Next, notification that the funds in the sender's account are reserved may be received (Step 606). Next, notification that the recipient has been notified of the reservation of funds, which are available for the recipient to receive, may be received (Step 608). Optionally, the notification that the recipient has been notified of the reservation of funds may include the recipient's preferred method of transfer. Next, acknowledgment that the secure fund transfer is complete may be received (Step 610).

Those skilled in the art will appreciate that these notifications and/or acknowledgments may be conveyed by any number of methods (e.g. email, short message service (SMS), through the payment processing system, and/or other notification methods). Optionally, the notifications and/or acknowledgments may be encrypted in order to protect any sensitive information.

The following is an example of the process described in FIGS. 3 and 6. Consider the scenario in which a tenant owes rent to a landlord that must be paid today. The landlord is located at a remote location and refuses to accept payment by any means except a physical check. Initially, the sender accesses a payment processing system and requests a secure fund transfer. The tenant may then enter the details of the secure fund transfer including the tenant's information; the tenant's account information; the landlord's information; the amount of funds to be transferred; and the tenant's two preferred methods of transfer, physical check and electronic bill pay. After the tenant has entered the details, the tenant may initiate a secure fund transfer using the transfer details. The tenant then receives notification that the funds are reserved and that an email notification has been sent to the landlord.

At this stage, the landlord receives notification of the secure fund transfer, notifying the landlord that the funds are reserved for the landlord to receive. The landlord may subsequently choose a physical check as his preferred method of transfer and accept the secure fund transfer as payment for the rent. After the secure fund transfer is accepted by the landlord, the tenant receives an email notification that the secure fund transfer has been accepted by the landlord and that the landlord prefers the funds be transferred by physical check. The tenant may select a hyperlink to the payment processing system included in the notification that the secure fund transfer has been accepted by the landlord. Once the tenant returns, via the hyperlink to the payment processing system, the tenant may then authorize a third-party payment processor to mail a physical check on his behalf.

At this stage, a third-party payment processor may generate a physical check, specifying funds from the tenant's account in the amount to be transferred, and then mail the physical check to the landlord. Upon receipt of the physical check, the landlord presents the physical check to a financial institution and requests the amount specified by the check be deposited in the landlord's account. The financial institution subsequently deposits the amount of the check into the landlord's account and clears the check with the reserved funds from the tenant's account. After the check has been cleared, the tenant receives acknowledgment that the secure fund transfer is complete.

Figure 7:
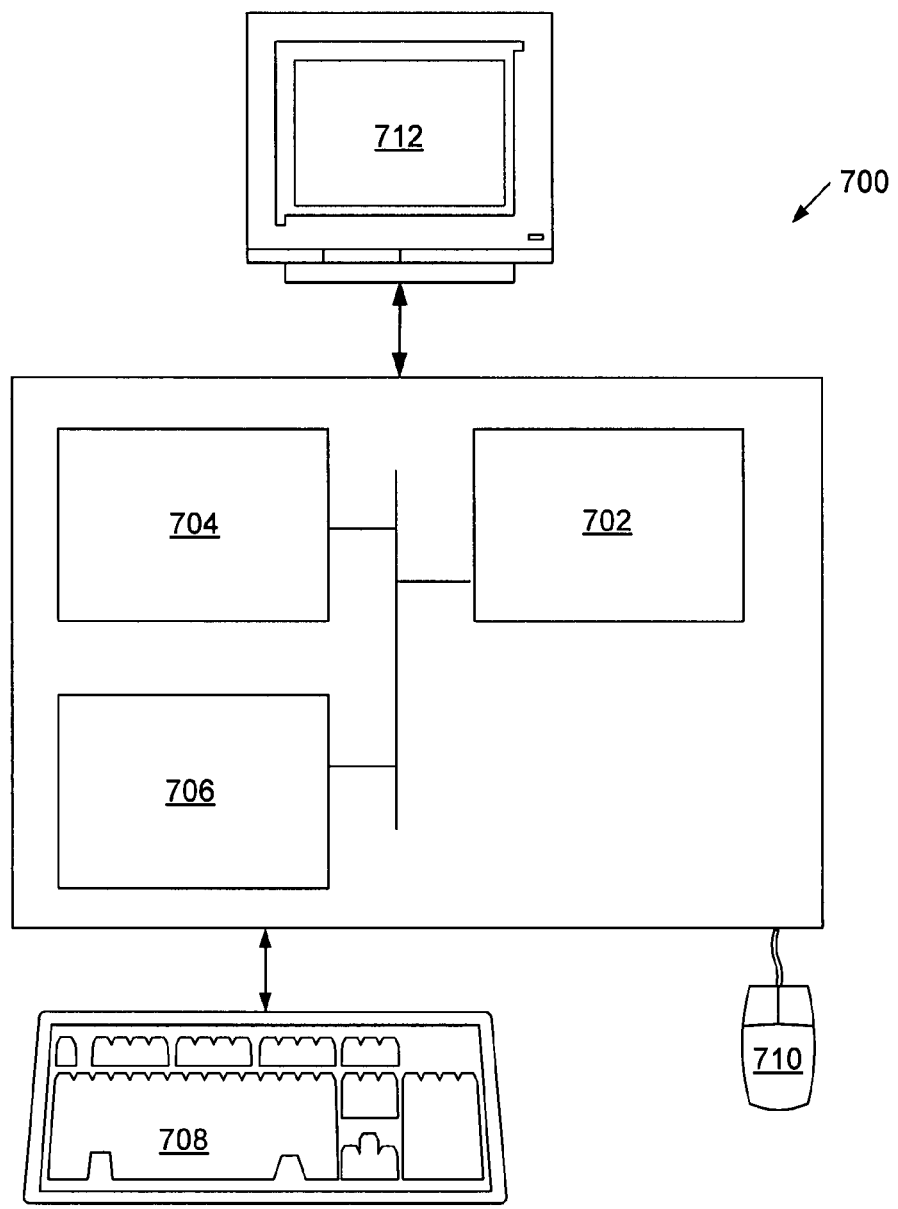
FIG. 7 shows a computer system in accordance with on or more embodiments of the invention.

The invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (700) may be located at a remote location and connected to the other elements over a network.

Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory.

In one embodiment of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring funds using an electronic check system, the method comprising:
   receiving, by the electronic check system using a hardware processor, a request to initiate a secure fund transfer, wherein the request to initiate the secure fund transfer specifies a sender, a sender account, a recipient, a recipient account, and an amount of the funds to transfer from the sender to the recipient, wherein the sender sends the funds, and wherein the recipient receives the funds;
   sending, using the hardware processor, a request to verify that the sender account comprises at least the amount of the funds to be transferred;
   receiving, using the hardware processor, a notification that the sender account comprises at least the amount of the funds to be transferred;
   requesting, by the electronic check system using the hardware processor, a reservation of the funds in the sender account corresponding to the amount of the funds to be transferred, wherein the reservation of the funds flags the amount of the funds to be transferred, located in the sender account, as reserved;
   receiving, by the electronic check system using the hardware processor, a notification of the reservation of the funds;
   notifying, by the electronic check system using the hardware processor, the recipient that the amount of the funds to be transferred is reserved after receiving the notification of the reservation of the funds;
   sending, after receiving notification of the reservation, a request to the recipient for a selection of a preferred funds transfer method from a list of sender approved funds transfer methods, wherein the request to the recipient comprises the list of sender approved funds transfer methods;
   receiving, from the recipient, the selection of the preferred funds transfer method from the list of sender approved funds transfer methods, wherein the preferred funds transfer method is a physical check;

initiating a mailing of the physical check, to the recipient in the amount of the funds to be transferred according to the preferred funds transfer method; and releasing, after the physical check is mailed, the reservation of the funds based on the recipient failing to present the physical check for payment prior to an expiration date of the physical check.

2. The method of claim 1, wherein the amount of the funds to be transferred is associated with a payment in a commercial transaction.

3. The method of claim 1, wherein initiating the mailing of the physical check comprises prompting the sender to mail, to the recipient, the physical check in the amount of the funds to be transferred.

4. The method of claim 1, wherein initiating the mailing of the physical check comprises requesting a third-party entity to mail, to the recipient, the physical check in the amount of the funds to be transferred.

5. The method of claim 1, wherein notifying the recipient comprises sending an electronic message to the recipient.

6. The method of claim 5, wherein the electronic message is an email message.

7. The method of claim 5, wherein the electronic message is a Short Message Service (SMS) message.

8. The method of claim 1, wherein requesting the reservation of the funds comprises requesting the amount of the funds be transferred to a separate account, wherein the separate account and the sender account are both associated with a same financial institution.

9. The method of claim 1, wherein the list of sender approved funds transfer methods comprises an automatic clearing house payment, an electronic wiring system, and the physical check.

10. A computer system for transferring funds, comprising:
a memory comprising software instructions;
a tangible processor configured to execute the software instructions on an electronic check system, wherein the electronic check system is configured to:
accept a request to perform a secure fund transfer using transfer details, wherein the transfer details specify a sender, a sender account, a recipient, a recipient account, and an amount of the funds to be transferred from the sender to the recipient, wherein the sender sends the funds, and wherein the recipient receives the funds,
request an account interface to reserve the funds in the sender account corresponding to the amount of the funds to be transferred, wherein the funds that are reserved are flagged in the sender account as reserved,
receive a notification that the funds are reserved in the sender account,
notify, after receiving the notification that the funds are reserved, the recipient of the funds that are reserved in the sender account with a request to the recipient for a selection of a preferred funds transfer method from a list of sender approved funds transfer methods, wherein the request to the recipient comprises the list of sender approved funds transfer methods,
receive, from the recipient, the selection of the preferred funds transfer method from the list of sender approved funds transfer methods, wherein the preferred funds transfer method is a physical check, and
initiate a mailing of the physical check to the recipient in the amount of the funds to be transferred according to the preferred funds transfer method; and the account interface operatively connected to the electronic check system and configured to:
reserve, in response to the request to reserve the funds, the funds in the sender account via the preferred funds transfer method, and
release, after the physical check is mailed, the reservation of the funds based on the recipient failing to present the physical check for payment prior to an expiration date of the physical check.

11. The computer system of claim 10, wherein the account interface is owned by a first legal entity and the sender account is owned by a second legal entity.

12. The computer system of claim 10, wherein initiating the mailing of the physical check comprises sending a request a third-party entity to mail, to the recipient, the physical check in the amount of the funds to be transferred.

13. The computer system of claim 10, wherein notifying the recipient of the reservation of the funds in the sender account comprises sending the recipient an electronic message.

14. The computer system of claim 13, wherein the electronic message is an email.

15. The computer system of claim 13, wherein the electronic message is a Short Message Service (SMS) message.

16. The computer system of claim 10, wherein the memory further comprises:
a data structure comprising:
a first element comprising a reference to the sender account;
a second element comprising a reference to the recipient account; and
a third element comprising the preferred funds transfer method,
wherein at least one selected from a group consisting of the first element, the second element, and the third element are accessed within the electronic check system to transfer the funds.

17. The computer system of claim 10, wherein the list of sender approved funds transfer methods comprises an automatic clearing house payment, an electronic wiring system, and the physical check.

18. A non-transitory computer readable medium, embodying instructions executable by the computer to perform method steps for transferring funds using an electronic check system, the instructions comprising functionality to:
receive a request to initiate a secure fund transfer, wherein the request to initiate the secure fund transfer specifies a sender, a sender account, a recipient, a recipient account, and an amount of the funds to transfer from the sender to the recipient, wherein the sender sends the funds, and wherein the recipient receives the funds;
send a request to verify that the sender account comprises at least the amount of the funds to be transferred;
receive a notification that the sender account comprises at least the amount of the funds to be transferred;
request a reservation of the funds in the sender account corresponding to the amount of the funds to be transferred, wherein the reservation of the funds flags the amount of the funds to be transferred, located in the sender account, as reserved;
receive a notification of the reservation of the funds;
notify the recipient that the amount of the funds to be transferred is reserved after receiving the notification of the reservation of the funds;
sending, after receiving the notification of the reservation, a request to the recipient for a selection of a preferred funds transfer method from a list of sender approved funds transfer methods, wherein the request to the recipient comprises the list of sender approved funds transfer methods;

receiving, from the recipient, the selection of the preferred funds transfer method from the list of sender approved funds transfer methods, wherein the preferred funds transfer method is a physical check;

initiate a mailing of the physical check, to the recipient, in the amount of the funds to be transferred according to the preferred funds transfer method; and releasing, after the physical check is mailed, the reservation of the funds based on the recipient failing to present the physical check for payment prior to an expiration date of the physical check.

19. The computer readable medium of claim 18, wherein the amount of the funds to be transferred is associated with a payment in a commercial transaction.

20. The computer readable medium of claim 18, wherein initiating the mailing of the physical check comprises prompting the sender to mail, to the recipient, the physical check in the amount of the funds to be transferred.

21. The computer readable medium of claim 18, wherein initiating the mailing of the physical check comprises requesting a third-party entity to mail, to the recipient, the physical check in the amount of the funds to be transferred.

22. The computer readable medium of claim 18, wherein notifying the recipient comprises sending an electronic message to the recipient.

23. The computer readable medium of claim 22, wherein the electronic message is an email message.

24. The computer readable medium of claim 22, wherein the electronic message is a Short Message Service (SMS) message.

25. The computer readable medium of claim 18, wherein requesting the reservation of the funds comprises requesting the funds be transferred to a separate account, wherein the separate account is associated with the same financial institution as the sender account.

26. The computer readable medium of claim 18, wherein the list of sender approved funds transfer methods comprises an automatic clearing house payment, an electronic wiring system, and the physical check.

* * * * *